United States Patent
Besseau et al.

(10) Patent No.: US 9,834,317 B2
(45) Date of Patent: Dec. 5, 2017

(54) METHOD FOR IDENTIFYING A PIECE OF DEFECTIVE EQUIPMENT IN AN AIRCRAFT

(71) Applicants: Airbus Operations (S.A.S.), Toulouse (FR); Airbus (S.A.S.), Blagnac (FR)

(72) Inventors: Stéphane Besseau, Toulouse (FR); Jean-Max Huet, Launaguet (FR); François Michaud, Toulouse (FR); Eric Ben Hamou, Aurade (FR); Loïc Joffre, Blagnac (FR); Bruno Maillard, Tournefeuille (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 34 days.

(21) Appl. No.: 14/491,622

(22) Filed: Sep. 19, 2014

(65) Prior Publication Data
US 2015/0088363 A1    Mar. 26, 2015

(30) Foreign Application Priority Data
Sep. 20, 2013  (FR) ..................... 13 59066

(51) Int. Cl.
*B64D 45/00*  (2006.01)
*G06F 11/22*  (2006.01)

(52) U.S. Cl.
CPC .......... *B64D 45/00* (2013.01); *G06F 11/2294* (2013.01); *B64D 2045/0085* (2013.01)

(58) Field of Classification Search
CPC ............ B64D 45/00; B64D 2045/0085; G06F 11/2294; G06F 8/61; G06F 8/64; Y10S 707/99936

(Continued)

(56) References Cited

U.S. PATENT DOCUMENTS 5,161,158 A *  11/1992  Chakravarty ......... G06F 11/261
                                                                714/26
5,522,026 A *   5/1996  Records ............... G05B 23/027
                                                                340/945

(Continued)

FOREIGN PATENT DOCUMENTS

FR    2 914 764 A1    10/2008
FR    2 938 676 A1     5/2010

(Continued)

OTHER PUBLICATIONS

French Search Report for Application No. 1357572 dated Mar. 27, 2014.

(Continued)

*Primary Examiner* — Stephen Holwerda
(74) *Attorney, Agent, or Firm* — Jenkins, Wilson, Taylor & Hunt, P.A.

(57) ABSTRACT

A method of assistance for troubleshooting is provided. A purpose is to prioritize identifiers each associated with a piece of equipment the failure of which can be the cause of a fault within an aircraft. The method is based on transmitting to an expert system, a list of identifiers, and receiving, for each identifier, a family of pertinent parameters, with each pertinent parameter being associated with at least one sensor of the aircraft and taking measurements of the pertinent parameters. Knowing these measurements, it is possible to deduce therefrom, for each identifier, a priority corresponding to the probability that the associated equipment is effectively defective. A system for implementing this method is also provided.

16 Claims, 4 Drawing Sheets

(58) Field of Classification Search
USPC ......... 701/29.1, 29.6, 31.4, 31.5, 31.6, 31.7, 701/31.8
See application file for complete search history.

(56) References Cited

U.S. PATENT DOCUMENTS

| | | | | |
|---|---|---|---|---|
| 6,003,808 | A * | 12/1999 | Nguyen | B64F 5/60 244/1 R |
| 6,122,575 | A * | 9/2000 | Schmidt | G06F 11/2252 244/1 R |
| 6,292,723 | B1 * | 9/2001 | Brogan | F02C 9/00 701/31.7 |
| 6,636,771 | B1 * | 10/2003 | Varma | B61C 17/04 700/21 |
| 7,149,612 | B2 * | 12/2006 | Stefani | G01D 9/005 701/29.1 |
| 8,069,167 | B2 | 11/2011 | Gao | |
| 8,112,368 | B2 | 2/2012 | Eklund | |
| 8,140,298 | B2 | 3/2012 | Bordry | |
| 2002/0143443 | A1 | 10/2002 | Betters et al. | |
| 2006/0229851 | A1 * | 10/2006 | Cannon | G07C 5/008 702/193 |
| 2007/0033277 | A1 * | 2/2007 | Yukawa | G05B 23/0267 709/224 |
| 2007/0115938 | A1 | 5/2007 | Conzachi et al. | |
| 2010/0017167 | A1 | 1/2010 | Duc et al. | |
| 2010/0023201 | A1 * | 1/2010 | Kinney | G05B 23/0264 701/31.4 |
| 2010/0042445 | A1 | 2/2010 | Nicosia | |
| 2011/0153540 | A1 | 6/2011 | Beg et al. | |
| 2011/0276832 | A1 | 11/2011 | Schneider et al. | |
| 2012/0078463 | A1 | 3/2012 | Gros | |
| 2012/0101793 | A1 | 4/2012 | Cheriere et al. | |
| 2012/0271587 | A1 | 10/2012 | Shibuya | |
| 2013/0132001 | A1 | 5/2013 | Yacout | |
| 2015/0039551 | A1 | 2/2015 | Huet et al. | |

FOREIGN PATENT DOCUMENTS

| | | | |
|---|---|---|---|
| FR | 2 966 616 | A1 | 4/2012 |
| FR | 2 970 796 | A1 | 7/2012 |

OTHER PUBLICATIONS

French Search Report for Application No. 1359066 dated Jul. 24, 2014.

Non-Final Office Action for U.S. Appl. No. 14/341,272 dated Nov. 17, 2016.

* cited by examiner

METHOD FOR IDENTIFYING A PIECE OF DEFECTIVE EQUIPMENT IN AN AIRCRAFT

CROSS-REFERENCE TO RELATED APPLICATION

This application claims the benefit of and priority to French Patent Application No. 13 59066 filed Sep. 20, 2013, the entire disclosure of which is incorporated by reference herein.

TECHNICAL FIELD

This disclosure relates to the field of assistance in troubleshooting for aircraft, and more particularly the field of identifying a defective piece of equipment within an aircraft.

BACKGROUND

It is known in prior art messages reporting a fault, transmitted particularly in flight from the aircraft to a ground station. Throughout the text, "fault" refers to any abnormal operation of a piece of equipment of the aircraft. Typically, the message reporting a fault is transmitted in the form of an ACARS (Aircraft Communication Addressing and Reporting System) message. Different examples of messages reporting a fault are known, particularly:
- failure messages, initially provided to report the fault to the maintenance system within the aircraft;
- warnings (referred to as "FDCE" for "Flight Deck and Cabin Effects"), initially provided to report a fault to the pilots; and
- fault cases, which are messages that combine a warning and a failure message.

The message reporting a fault is received by a ground station, dedicated to the maintenance of the aircraft. An equipment identifying device is then used which makes it possible to associate a message reporting a fault with a list of pieces of equipment, the failure of which could be the cause of the fault. The list is complete, but the pieces of equipment are listed according to a predetermined and fixed order. In other terms, the pieces of equipment are listed according to an order that does not depend on the current context of the fault. Such an equipment identifying device generally contains an electronic version of the trouble shooting manual (TSM). The list of pieces of equipment is generally in the form of a list of identifiers, with each identifier being uniquely associated with a piece of equipment of which the failure could be the cause of the fault. The identifiers are called FIN, for "Functional Item Number".

It is then necessary to wait for the aircraft to be on the ground in order to send a technician who will test the operation of the various pieces of equipment on the list, in the predetermined order, in order to determine which piece of equipment on the list is effectively defective. The technician will then be able to repair or replace this defective piece of equipment.

A disadvantage in this method is that it requires that the aircraft be immobilised on the ground long enough so that the technician can test, in the predetermined order, the operation of the various pieces of equipment on this list, identify the piece of equipment that is effectively defective, then repair or replace this piece of defective equipment.

SUMMARY

An objective of this disclosure is to propose a method that makes it possible to reduce immobilization time on the ground of an aircraft after a fault has been reported.

This objective is achieved with a method for assistance in troubleshooting for an aircraft comprising:
- receiving a message transmitted by the aircraft and reporting a fault;
- transmitting to an equipment identifying device, a query formed using the message, and obtaining in response a list of identifiers each associated with a piece of equipment the failure of which can be the cause of the fault.

According to the disclosure, these steps are implemented by a troubleshooting assistance server, with the troubleshooting assistance server then implementing the following steps:
- transmitting to an expert system, a query formed using the list of identifiers, and receiving a response that gives, for each identifier, a family of pertinent parameters, with each pertinent parameter being associated with at least one sensor of the aircraft;
- transmitting to a data acquisition device on board the aircraft, an acquisition order and receiving in return measurements of the pertinent parameters.

The expert system then implements the following steps, for each family of pertinent parameters:
- comparison between the measurements of the pertinent parameters of the family, and a predetermined criterion associated with the family;
- according to the results of the comparison, assigning of a priority to the identifier corresponding to the family.

The priority of an identifier corresponds advantageously to how the corresponding piece of equipment is likely to be defective. In other words, the priority is a risk, for a piece of equipment, to be defective. In other words, the priority is a susceptibility, for a piece of equipment, to be defective.

In particular, the priority of an identifier can be a piece of information representative of how the corresponding piece of equipment is likely to be defective. It can be a digital indicator, for instance a number corresponding to the probability that the corresponding piece of equipment is defective, or an integer corresponding to a rank in a ranking of the pieces of equipment according to a susceptibility to be defective.

Thus, a series of steps is implemented that makes it possible to assign a priority to each element on the list of identifiers. In other terms, the identifiers are prioritised by assigning a priority to them.

The pieces of equipment that correspond to a high-priority identifier are more likely to be defective.

The pieces of equipment that correspond to a low-priority identifier are less likely to be defective.

The pieces of equipment will be tested in decreasing order of their priority. Thus, the time elapsed, between the start of the maintenance operations and identification of an effectively defective piece of equipment thanks to the tests of the maintenance teams, is statistically reduced.

The pieces of equipment that correspond to low-priority identifiers will be tested only if none of the pieces of equipment corresponding to an identifier of higher priority is identified as being effectively defective.

The method can be implemented during a flight phase of the aircraft, or when the aircraft is on the ground.

Thus, the immobilization time on the ground of the aircraft is reduced, since the number of pieces of equipment that will have to be tested by a maintenance team is statistically reduced.

The method according to the disclosure can comprise this step of testing at least one piece of equipment among the pieces of equipment associated with the list of identifiers. The pieces of equipment are tested as a function of the priority of their respective identifiers, and beginning with the piece of equipment which is the most likely to be defective. This step of test is carried out by a technician. The step of test is disrupted when a tested piece of equipment is identified as being effectively defective.

In particular, the method according to the disclosure can comprise the step of testing the pieces of equipment the failure of which can be the cause of the fault, in the descending order of the priorities assigned to their respective identifiers.

Furthermore, the method according to the disclosure is fully automated. It does not require the intervention of human operators, in particular of technical experts of the equipment of the aircraft.

Advantageously, the method according to the disclosure comprises a step of consulting the expert system in order to obtain, for each family of pertinent parameters, the predetermined criterion associated with the family.

A pertinent parameter can comprise at least one element from among a Boolean, an integer, a floating point number, a sequence of numerical values corresponding to a portion of a curve, a sequence of characters.

Preferably, the method according to the disclosure comprises a step, referred to as initial step, of determining, for each identifier, a family of pertinent parameters and a predetermined criterion that are associated.

The initial step can include storage:
of measurements of parameters, associated with preceding aircraft flights; and
fault information associated with these flights and coming from a post flight report and/or an aircraft maintenance logbook (simply referred as logbook).
Preferable, the initial step further comprises:
for each preceding aircraft flight, defining of a basic set that groups together the measurements of at least one parameter referred to as a useful parameter;
ranking of the basic sets into clusters defined by at least one common characteristic;
using the fault information, assigning, to the preceding flights and to the basic sets that correspond to these preceding flights, information according to which a predetermined piece of equipment is defective.

The useful parameter(s) forming the basic set is (are) the same for each preceding aircraft flight.

These steps are advantageously followed by an adjustment in the choice of the at least one common characteristic and of the at least one useful parameter, in such a way as to form a cluster, referred to as a useful cluster:
wherein a portion of the basic sets associated with the defective predetermined piece of equipment, is greater than a predetermined accuracy threshold,
the at least one useful parameter corresponding to the family of pertinent parameters associated with an identifier of the predetermined piece of equipment, and the at least one common characteristic corresponding to the predetermined criterion associated with the family.

Alternatively, these steps are advantageously followed by an adjustment of a choice of at the least one common characteristic and of the at least one useful parameter, in such a way as to form a cluster, referred to as a useful cluster:
wherein a portion of the basic sets associated with the defective predetermined piece of equipment, is greater than a predetermined accuracy threshold, and
receiving a portion of the basic sets associated with the defective predetermined piece of equipment, is greater than a predetermined coverage threshold,
the at least one useful parameter corresponding to the family of pertinent parameters associated with an identifier of the predetermined piece of equipment, and the at least one common characteristic corresponding to the predetermined criterion associated with the family.

The accuracy threshold can be at least 60%.
Alternatively, the accuracy threshold can be at least 90%.
The coverage threshold can be at least 60%.
Alternatively, the coverage threshold can be at least 90%.

Preferably, the method according to the disclosure comprises an adjustment of the choice of at least one useful parameter in such a way that the basic sets of the useful cluster group together the measurements of a minimum number of useful parameters.

The method according to the disclosure can comprise a calculation of an accuracy of the useful cluster, defined by the ratio of a number of basic sets of the useful cluster associated with the defective predetermined piece of equipment, over a total number of basic sets of the useful cluster, with the assigned priority being equal to the accuracy.

The disclosure also relates to a troubleshooting assistance system of an aircraft, comprising a troubleshooting assistance server and an expert system in communication with the server.

According to the disclosure:
the expert system hosts a database that stores a plurality of triplets, with each triplet comprising or consisting of:
an identifier associated with a piece of equipment of the aircraft,
a family of pertinent parameters, with each pertinent parameter being associated with at least one sensor of the aircraft, and
a predetermined criterion for assigning a priority or non-priority nature to the identifier;
the troubleshooting assistance server is configured to:
receive from a warning device of the aircraft a message reporting a fault of the aircraft;
transmit to an equipment identifying device a query formed using the message, and obtain in response a list of identifiers each associated with a piece of equipment the failure of which can be the cause of the fault;
transmit to the expert system a query formed using the list of identifiers, and receive a response that gives, for each identifier, the family of pertinent parameters stored within the same triplet;
transmit to a data acquisition device on board the aircraft an acquisition order and receive in return measurements of the pertinent parameters;
the expert system being configured to compare, for each family of pertinent parameters, the received measurements with a predetermined criterion and to deduce therefrom a priority of the identifier.

The priority of an identifier corresponds advantageously to how the corresponding piece of equipment is likely to be defective.

BRIEF DESCRIPTION OF THE DRAWINGS

This disclosure shall be better understood when reading the description of embodiments provided solely for the purposes of information and in no way restrictive, in reference to the annexed drawings wherein.

DETAILED DESCRIPTION

Figure 1:
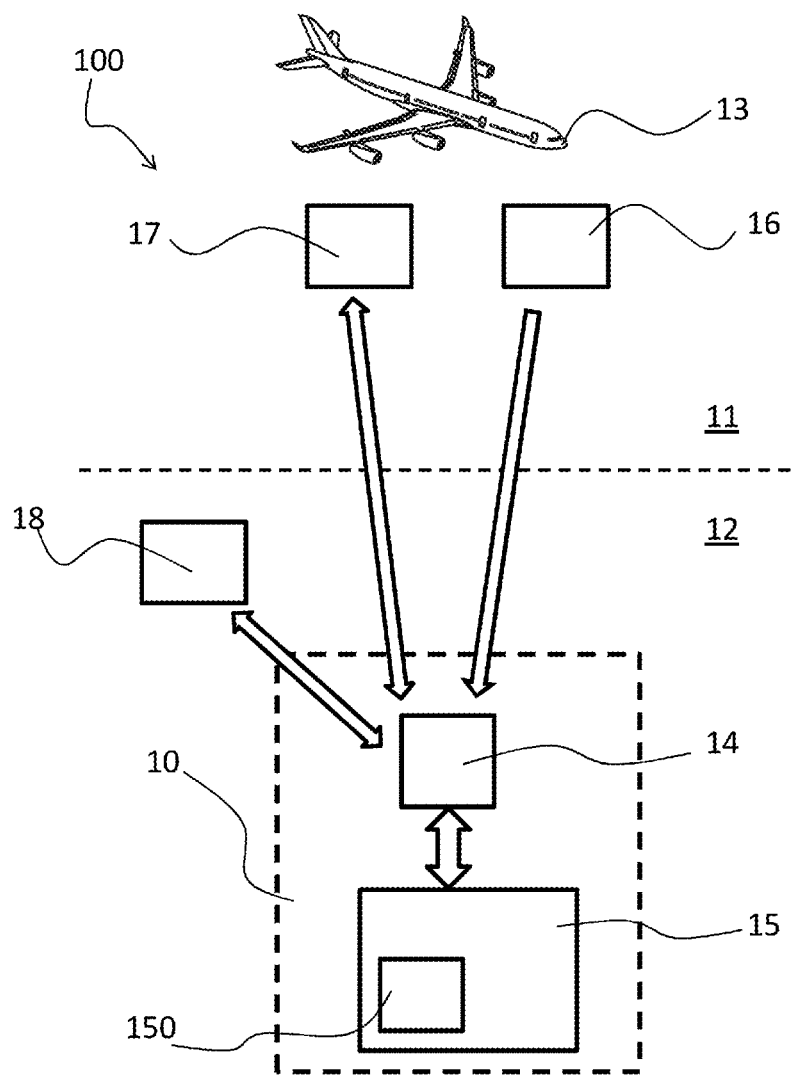
FIG. 1 shows a troubleshooting assistance system according to an embodiment of the disclosure.

FIG. 1 shows an installation 100 implementing an embodiment of the method according to the disclosure, and comprising a troubleshooting assistance system 10 according to the disclosure.

FIG. 1 shows an example of implementing the method according to the disclosure during a flight phase of the aircraft. However, it could also be considered to implement the method according to the disclosure when the aircraft is on the ground.

FIG. 1 distinguishes a first portion 12 corresponding to a base on the ground, and a second portion 11 corresponding to the elements on board the aircraft 13 in flight.

The system 10 according to the disclosure comprises:
a troubleshooting assistance server 14; and
an expert system 15.

The expert system 15 particularly comprises a database 150. The expert system 15 can include electronics and a computer and/or software. This is typically a digital or analogue circuit, preferably dedicated, associated with a microprocessor and/or a computer. The database 150 stores triplets of data comprising:

an identifier associated with a piece of equipment of the aircraft 13;
a family of pertinent parameters, with this family able to be reduced to a single pertinent parameter; and
a predetermined criterion in order to assign a priority to each identifier of the family, according to the measurements of the associated pertinent parameters.

Each pertinent parameter is associated with at least one sensor of the aircraft. In other terms, a measurement of a pertinent parameter is obtained using at least one sensor located in the aircraft.

A measurement of a pertinent parameter can be the sampling of raw data, obtained directly at the output of the sensor, or the sampling of pre-processed data from the sensor obtained at the output of a calculator connected to the sensor. This data can be a single value or a sequence of values.

A pertinent parameter is for example:
a Boolean: for example the indication according to which a valve is open or closed;
an integer or a floating point number: for example a speed, an acceleration, a pressure, a temperature;
a chain of characters: for example the state of a system;
a sequence of numerical values that corresponds to the points of a curve describing for example the change as a function of time, of an altitude, of a fuel level;
a sequence of Boolean values (change in the logic state over time, for example the behaviour of a valve).

The troubleshooting assistance server 14 exchanges information with various peripheral devices, in particular:
a warning device 16 of the aircraft, that transmits to the ground at least one message reporting a fault. Thus, the troubleshooting assistance server 14 receives the message reporting a fault, sent by the warning device 16;

an equipment identifying device 18 such as described in the introduction, in order to obtain, using the message reporting a fault, a list of identifiers of pieces of equipment suspected of failure. Thus, the troubleshooting assistance server 14 transmits to the equipment identifying device 18 a query formed using the message reporting a fault and receives in response a list of the identifiers each associated with a piece of equipment, the failure of which can be the cause of the fault;

the expert system 15. Thus, the troubleshooting assistance server 14 transmits to the expert system 15 a query formed using the list of identifiers, and receives in return, for each identifier, a family of pertinent parameters; and a data acquisition device 17 of the aircraft, so that the troubleshooting assistance server 14 enquires and receives listings of measurements of the pertinent parameters.

The expert system 15 is configured for calculating, in order to compare, for each family of pertinent parameters, the measurements received from the data acquisition device 17 and a predetermined criterion. According to the results of the comparison, the expert system is configured to determine the priority of the corresponding identifier.

Figure 3:
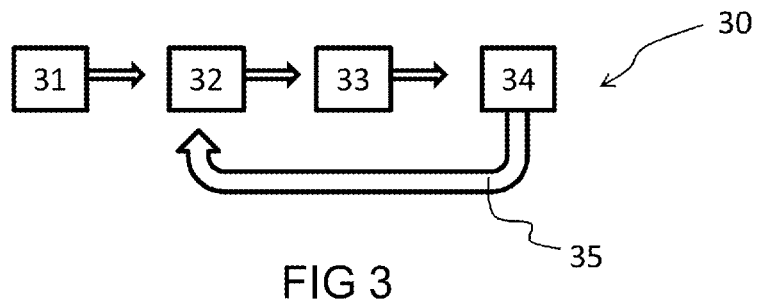
FIG. 3 shows steps of determining, for an identifier, a family of pertinent parameters and a predetermined criterion that are associated.
Figure 4:
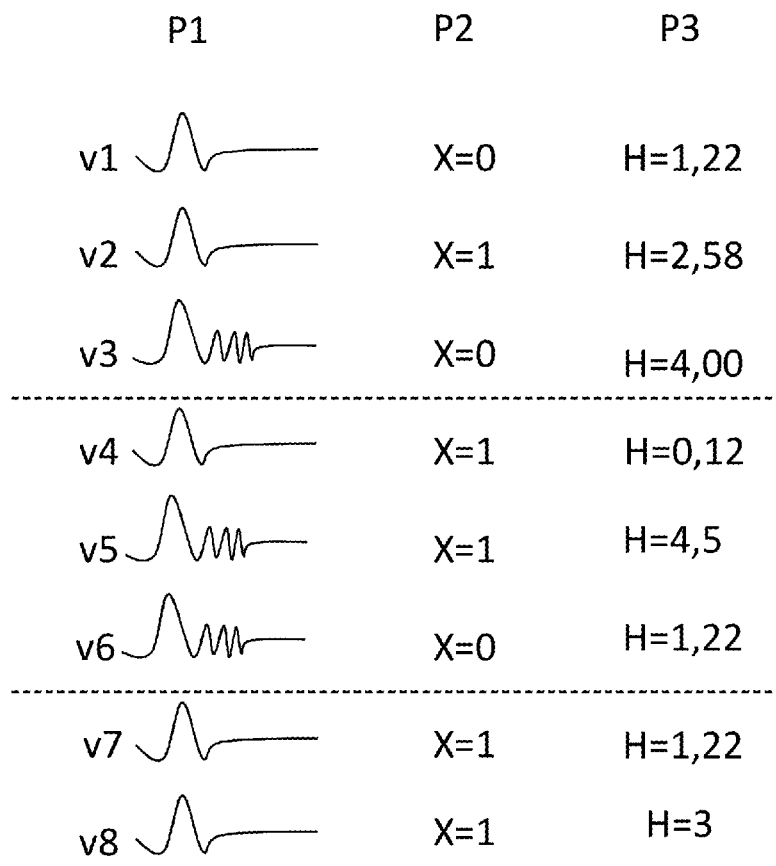
FIG. 4 shows the measurements of three parameters, associated with eight preceding aircraft flights.
Figure 5:
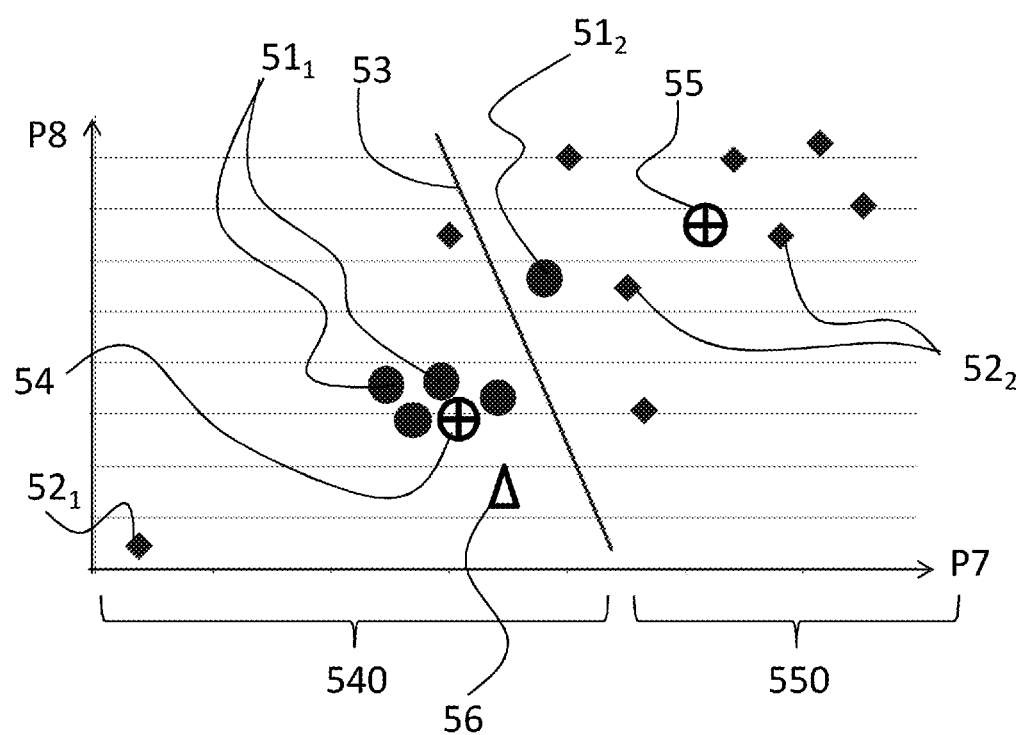
FIG. 5 shows the method for determining a priority, using the measurements of parameters associated with preceding aircraft flights, and ranked into two clusters.

For each identifier, the family of pertinent parameters and the predetermined criterion that are associated are advantageously determined using:

collecting of data from preceding flights (measurements of parameters corresponding to preceding flights of a fleet of aircrafts, and fault information coming for example from the post flight report (or PFR), or from the logbook of these same aircrafts);

data mining, for which a detailed example will be covered in reference to FIGS. 3 to 5.

The post flight report summarises the failure messages generated during a flight. The logbook lists the maintenance operations (repairs, replacing) carried out after a flight.

The data acquisition device 17 of the aircraft is connected to sensors of the aircraft and centralises listings of measurements (raw or pre-processed data) carried out thanks to these sensors. The measurements are taken continuously, at a frequency between 0.125 Hz and 128 Hz. In other terms, the data acquisition device 17 takes the measurements of many parameters linked to the aircraft, including of the pertinent parameters. The data acquisition device 17 of the aircraft is typically the ACMS (Aircraft Condition Monitoring System). The ACMS is a recorder of parameters inside the aircraft, recording in particular the pertinent parameters. The ACMS is connected to many sensors of the aircraft.

The equipment identifying device 18 supplies, in response to a message reporting a fault, a list of identifiers each associated with a piece of equipment the failure of which can be the cause of this fault. For example, the message reporting a fault reports a braking time that is too long. A failure of the brake, of the wheel, a leak in the control system of the wheel, can be the cause of braking time that is too long. The equipment identifying device 18 then supplies, in response to such a failure message, a list of the identifiers corresponding to the brake, to the wheel, to the control system of the wheel. The equipment identifying device contains for example an electronic version of the TSM manual, as explained hereinabove. A piece of equipment, the failure of which can be the cause of the fault, can be a unit referred to as an LRU (line-replaceable unit). This is a module that can be replaced easily within an aircraft. This can be a pump, a valve, a switch, a relay, a processor, etc.

In reference to FIG. 2, an example of the method of troubleshooting assistance 2 according to the disclosure shall now be described. Such a method can be implemented in an installation 100 such as described in reference to FIG. 1, using the troubleshooting assistance system 10.

This method is advantageously implemented on the ground, while the aircraft is in flight.

The method comprises a first step 20 of receiving a fault case (FC) message reporting a fault, such as described in the introduction. The FC message is sent by the warning device 16. It is received by the troubleshooting assistance server 14.

The step 20 is followed by a step 21 of consulting the equipment identifying device 18. In this step, the troubleshooting assistance server transmits to the equipment identifying device 18 a query formed using the FC message, and receives in response a list of identifiers FIN1, FIN2, FIN3, with this list corresponding to the FC message.

The step 21 is followed by a step 22 of consulting the expert system 15 by the troubleshooting assistance server 14. The troubleshooting assistance server 14 transmits to the expert system 15 a query formed using the list of identifiers, and receives in response, for each identifier, a family of at least one pertinent parameter. Here, the parameters $P_X$ and $P_Y$ are associated with the identifier FIN1, the parameters $P_W$, $P_Z$ are associated with the identifier FIN2, and the parameter $P_V$ is associated with the identifier FIN3.

During a step 23, the troubleshooting assistance server remotely retrieves the measurements of the pertinent parameters of each of the families. The troubleshooting assistance server 14 transmits to the data acquisition device 17 a query for the measurements of the pertinent parameters. This query can be transmitted via the uplink, for example of the satellite type, established between the troubleshooting assistance server 14, and the data acquisition device 17. In response to the query, the data acquisition device 17 transmits to the troubleshooting assistance server 14 the listing of measurements requested.

In our example, the measurement x is taken for the parameter $P_X$, the measurement y is taken for the parameter $P_Y$, the measurement w is taken for the parameter $P_W$, the measurement z is taken for the parameter $P_Z$ and the measurement v is taken for the parameter $P_V$.

For a first family of pertinent parameters, the method according to the disclosure comprises a step $24_1$ of comparing between the measurements of the pertinent parameters of the first family (x and y), and a predetermined criterion $C_1$ associated with the family. The predetermined criterion is stored in the expert system 15. The step $24_1$ is implemented by the expert system 15.

According to the results of the comparison, the expert system assigns, in a step $25_1$, a priority to the identifier associated with the first family.

Figure 2:
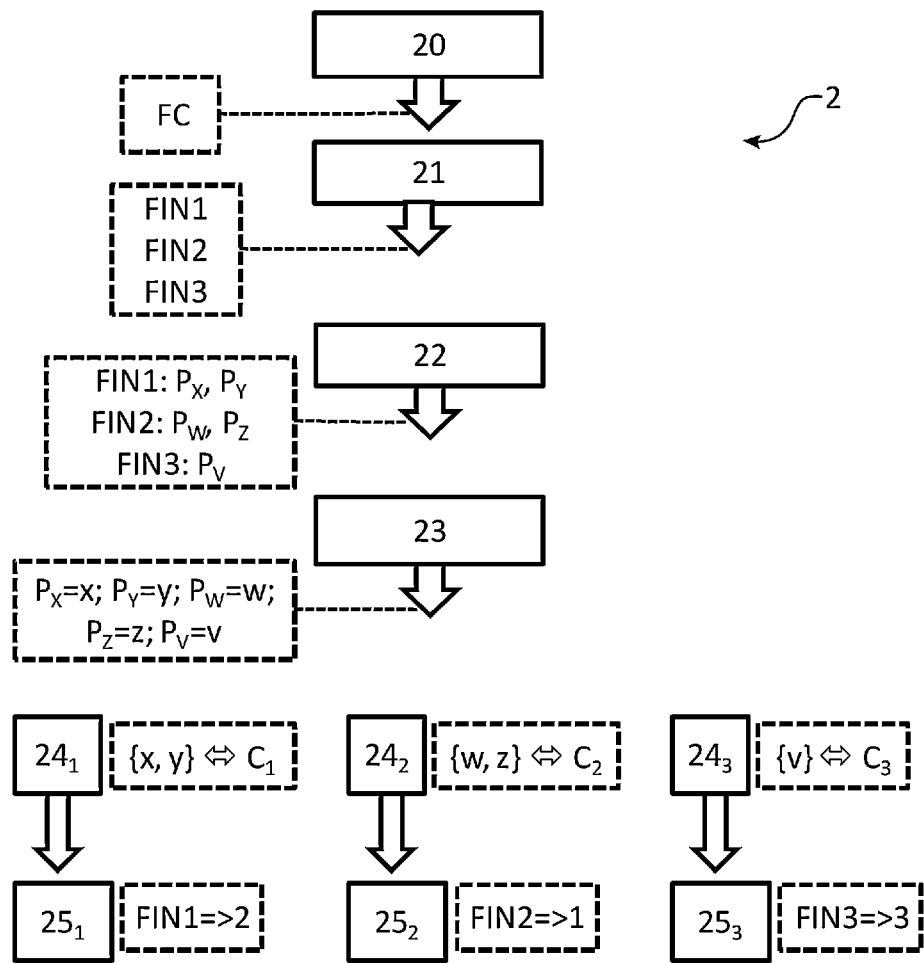
FIG. 2 shows a method according to an embodiment of the disclosure, implemented using the system shown in FIG. 1.

In the example shown in FIG. 2, the list comprises three identifiers. Three families of pertinent parameters must therefore be processed. The following has therefore been shown:
three steps $24_1$, $24_2$, $24_3$, of comparing between the measurements of the pertinent parameters associated with a family and a predetermined criterion $C_1$, $C_2$, $C_3$ associated with the family, and
three steps $25_1$, $25_2$, $25_3$, of assigning a priority to an identifier.

In the example shown in FIG. 2, the identifier FIN2 has the highest priority (priority of 1). It is deduced from this that the piece of equipment corresponding to the identifier FIN2 is probably the defective equipment, with the other pieces of equipment corresponding to identifiers FIN1 and FIN3 being probably not defective. If the equipment identified as FIN2 is not defective, testing will then be carried out in the following order: first the equipment identified as FIN1 (priority of 2), then the equipment identified as FIN3 (priority of 3).

Advantageously, the method comprises a step of transmitting to a maintenance center, the list of identifiers, each identifier being associated with a priority. An equipment identifier associated with a low priority will not be tested first by the maintenance teams, who will preferentially test the equipment associated with a high priority.

The steps 23, $24_i$ and $25_i$ can be reiterated at least once, in such a way as to best refine a prioritisation of the identifiers of the list supplied in the step 21.

It can be seen that all of the steps of the method according to the disclosure can be automated, without it being necessary to have recourse to a human operator, particularly a specialist in aircraft equipment.

FIG. 3 shows an initial step 30 of determining, for an identifier, a family of at least one pertinent parameter and an associated predetermined criterion. The initial step 30 is broken down into several steps described herein below.

The first step 31 comprises storage:
of measurements of parameters relative to preceding aircraft flights; and
fault information associated with these preceding flights, and typically coming from a post flight report and/or from a logbook of the aircraft.

During a following step 32, for each flight, a basic set is defined that groups together the measurements of at least one parameter, referred to as useful parameter.

Useful parameter will be used to refer to any parameter used to constitute basic sets of measurements of at least one parameter, with these basic sets then being distributed into clusters according to common characteristics.

Then, in the step 33, the basic sets are ranked into clusters defined by at least one common characteristic. The constitution of clusters can implement various known algorithms, for example:
the k-means algorithm;
priority grouping algorithms;
the algorithm based on the density in the measurement (DBSCAN for "Density-Based Spatial Clustering of Applications with Noise").
The k-means algorithm can implement the following steps:
determining the value of k (number of clusters). This step is automated in such a way as to optimise the number of clusters according to a criterion:
that takes into account a Gaussian distribution in order to distribute points into different clusters centered on a Gaussian center; or
that takes into account a criterion referred to as BIC (Bayesian information criterion).
initializing the centers of the k clusters;
assigning each measurement to the cluster that has the nearest center;
calculating a modified center for each cluster, according to the measurements assigned to the cluster;
reiterating the steps of assigning each measurement to the cluster that has the nearest center and of calculating a modified center, until minimisation of the associated cost function (for example the square of the difference between the measurements and the center of the cluster).

Finally, in the step 34, preceding aircraft flights are associated with the information according to which a given piece of equipment is defective. Fault information associated with the preceding flights (logbooks, PFR, etc.) is used for this. A corresponding basic set can as such be associated with a preceding flight, and the information according to which a given piece of equipment is defective. The propensity of a cluster having a common characteristic, of being an indication of the failure of this piece of equipment can as such be characterised.

The arrow 35 symbolises an adjustment:
in the choice of at least one common characteristic that defines the clusters; and
of the useful parameters;
in such a way as to obtain a cluster, referred to as a useful cluster:
(condition A) wherein a portion of the basic sets associated with the defective predetermined piece of equipment, is higher than a desired threshold, referred to as the accuracy threshold (for example 60%, or 80%); and
(condition B) receiving a portion of the basic sets associated with the defective predetermined piece of equipment, greater than a desired threshold, referred to as coverage threshold (for example 60%, or 80%).

Throughout the text, a useful parameter is a parameter used to form a cluster. The useful cluster is a cluster of useful parameters that satisfy the conditions hereinabove, and retained to form a family of pertinent parameters according to the disclosure.

The adjustment can implement a logistic regression algorithm, a decision tree, an algorithm of the k nearest neighbours.

In other terms, the formation of clusters is guided, knowing the fault information.

A condition that can be taken into account in selecting the parameters that are going to form the family of pertinent parameters, is the robustness of the associated criterion, with regards to small variations. In other terms, it is sought to identify clusters that have characteristics that are sufficiently different so that it is possible to rank with certainty a measurement in one or the other cluster.

It can be seen that the disclosure is particularly interesting, in that it is based on a simple observation of parameters. It is not necessary to know a physical signification of these parameters in order to implement the disclosure. It is therefore not necessary to know the operation of the pieces of equipment of the aircraft, and the relations between them. The method according to the disclosure is therefore particularly simple to implement, since it does not require the intervention of technical experts specialised in the operation of each of the pieces of equipment of the aircraft.

It can be considered to proceed by processing basic sets of several parameters. A combination of parameters is first sought that makes it possible to define a useful cluster such as defined hereinabove. It is then observed, by suppressing one of these parameters, whether the distribution of the clusters remains unchanged or not. If when removing one parameter, the distribution of the clusters remains unchanged, this means that this parameter is not pertinent. If by removing one parameter, the distribution of the clusters is fundamentally changed, this means that this parameter is pertinent in defining the useful cluster. By selecting only pertinent parameters, a minimum number of parameters is obtained that makes it possible to define a useful cluster. Limiting the exchanges required between the system according to the disclosure and the data acquisition device of the aircraft is thus provided.

When the measurements of the parameters used during the initial step are sequences of values that are similar to curves, various means can be provided to simplify the calculations. The following steps will be advantageously implemented, for each curve corresponding to a preceding aircraft flight:

Segmentation of the curve: a minimum number of characteristic points are defined which define the curve (typically, local maxima and minima). It is thus possible to reduce the number of points that will be used for the following steps while still retaining the essential characteristics of the curve.

Adjusting the segmented curve: for the various flights that do not have the same duration, it is sought to adjust the curves of the various flights, for example via a method called "best fit" which consists in adjusting a curve such that it has a minimum distance with the other curves. This is also referred to as curve aligning. For this, a reference curve is constructed, for example by carrying out two-by-two comparisons according to a pyramidal diagram or a diagram in cascade. The reference curve has for example M characteristic points. Each curve is then aligned relatively to the reference curve. A segmented aligned curve is obtained.

The various segmented aligned curves are used to form the different clusters as described hereinabove. The curves can be cut into portions of a curve, and clusters can be formed by using these portions of a curve.

Once a minimum number of useful parameters that make it possible to satisfy the conditions A and B such as defined hereinabove has been defined:
the at least one useful parameter defines a family of at least one pertinent parameter such as defined in reference to FIGS. 1 and 2; and
the at least one common characteristic defining the basic sets of the useful cluster corresponds to the predetermined criterion such as defined in reference to FIGS. 1 and 2.

The clusters defined, it then becomes possible to position a measurement taken during a new flight of the aircraft in one of these clusters, as mentioned in the step 24 of FIG. 2.

In practice, portions of the curve can be recorded during the step of taking measurements of the pertinent parameters. In this case, a step of identifying a corresponding portion of curve on a reference curve can be provided. This step can be carried out by sliding the recorded portion of curve on the reference curve, and by recording the position for which the recorded portion of curve and the reference curve coincide the most, i.e. the position such that the distance between the recorded portion of curve and the reference curve is minimal. The distance can be a Euclidian distance, or a distance with dynamic time warping (DTW) that takes into account the position of a point at the same instant on the recorded portion of curve and on the reference curve. Knowing the position of the recorded portion of curve on the reference curve, the recorded portion of curve can be ranked in one or the other cluster defined during the initial step.

Furthermore, it is possible to work not on the curve obtained directly during the step of taking measurements, but on the discrete Fourier transform of this curve or the wavelet transform of this curve.

FIGS. 4 and 5 make it possible to show the steps 33 and 34 of FIG. 3. The idea is to establish a link between
a piece of equipment;
a fault of this piece of equipment (determined according particularly to the maintenance operations carried out after each flight and/or according to the post flight report obtained at the end of each flight); and
recordings of measurements of parameters,
in order to determine for each identifier, a family of pertinent parameters and an associated predetermined criterion.

A method for calculating the priority of an identifier shall also be presented.

The measurements of parameters relative to preceding aircraft flights are obtained by combining recordings of parameters of the aircraft, taken during these flights. For example data over a period of months or even years is collected. These recordings are generally taken by systems such as the ACMS during a flight, using a dedicated recorder. Recordings from a QAR (Quick Access Recorder) or DAR (Digital ACMS Recorder) are for example used. These devices carry out recordings of over 800 different parameters, all throughout the flight from take off until landing of the aircraft. Recordings from a SAR (Smart ACMS Recorder) can also be used. Such a device carries out recordings of a more reduced number of parameters, for example 256, recorded over defined intervals of time. Other recordings can also be used such as those of the DFDR (Digital Flight Data Recorder), or any other recording of measurements of parameters of the aircraft.

The logbook of the aircraft lists the maintenance operations carried out after a flight, in particular repaired or replaced pieces of equipment. The logbook gathers together data referred to as MIS (Maintenance Information System).

A post flight report lists all of the anomalies that occurred during a flight.

All of this information (post flight report, logbook, measurements of parameters associated with preceding aircraft flights), can be obtained using data from airlines, passing via the internet. Importing them into the database 150 can be provided, with the expert system 15 implementing steps for determining, for each identifier, a family of pertinent parameters and a predetermined criterion that are associated.

FIG. 4 shows the measurements of three parameters P1, P2, P3, during the eight preceding flights of aircraft v1, v2, v3, v4, v5, v6, v7, v8.

In order to simplify the explanation, only these three parameters P1, P2 , P3 shall be considered.

The parameter P1 corresponds to a sequence of values. Two clusters can be distinguished from among the measurements taken for the parameter P1, according to the common characteristics of these measurements:
  a first cluster corresponding to the flights v1, v2, v4, v7 and v8, defined by a single amplitude peak;
  a second cluster corresponding to the flights v3, v5, v6, defined by an amplitude peak followed by oscillations of a lesser amplitude.

Here, P1 is a useful parameter. A basic set groups together a measurement of the parameter P1. The basic sets are ranked into clusters according to the profile of the portion of curve P1.

Thanks to the logbook, it is known that a piece of equipment E was replaced after flights v3 and v6. In other terms, in the past, the maintenance teams determined, after flights v3 and v6, that the piece of equipment E was defective. In FIG. 4, these maintenance operations are each symbolised by a dotted line.

It is deduced from this that the piece of equipment E has abnormal operation during the flights v3 and v6, and that consequently the second cluster corresponding to the flights v3, v5 and v6 can characterise a failure of the piece of equipment E.

Out of the three elements of the cluster, two are associated with a defective piece of equipment. The parameter P1 can as such be used in order to determine whether or not element E is defective.

Considering a basic approach, the accuracy of a cluster is advantageously defined as being the ratio between the number of flights immediately preceding maintenance of the piece of equipment E and ranked in a predetermined cluster, and the total number of flights of the cluster.

In this case, the accuracy will therefore be approximately 67% (two elements of the cluster of three elements are associated with a piece of equipment E which is defective).

The parameter P1 will then form a family of pertinent parameters associated with the identifier of the piece of equipment E. The associated predetermined criterion is in the form of an amplitude peak followed by oscillations of a lesser amplitude.

If it is chosen to sue post flight reports rather than logbooks, there would be, for each flight, a list of anomalies occurring during a flight. Using an equipment identifying device such as defined hereinabove, it could be deduced therefrom the pieces of equipment that may have been defective during this flight. By identifying the common points between the measurements of parameters corresponding to the same piece of equipment that can be defective, it is possible, in the same way, to determine for each piece of equipment a family of pertinent parameters and an associated criterion. An advantage of using post flight reports is that the change of the measurements of parameters, during the flight, is available. It is therefore possible to identify simultaneous modifications of several parameters, subsequent to an anomaly. It is also possible to distinguish the appearance of a first fault, then of a second fault.

The parameter P2 corresponds to a Boolean X=0 or X=1. By following the same reasoning as for P1, the following are defined:
  a cluster X=0, corresponding to flights v1, v3, v6; and
  a cluster X=1, corresponding to flights v2, v4, v5, v7, v8.

In the same way as for parameter P1, thanks to the logbook, it can be deduced from this ranking that the cluster X=0 can characterise a failure of E.

One can also note that if clusters are defined, by considering basic sets that group together the useful parameters P1 and P2, four clusters are obtained:
  a cluster A1, defined by a unique amplitude peak and X=0;
  a cluster B1, defined by a unique amplitude peak and X=1;
  a cluster C1, defined by a amplitude peak followed by oscillations of a lesser amplitude and X=0; and
  a cluster D1, defined by an amplitude peak followed by oscillations of a lesser amplitude and X=1.

Thanks to the logbook, it can be deduced from this ranking that cluster C1 can characterise a failure of E.

The parameter P3 takes floating point numbers. By following the same reasoning as for P2, the following for example is defined:
  a cluster defined by H<2, corresponding to flights v1, v4, v6, v7;
  a cluster defined by H≥2, corresponding to flights v2, v3, v5, v8.

Note that the measurements of H corresponding to the flight v6 (just before the maintenance on the piece of equipment E) and to the flight v7 (just after the maintenance) belong to the same cluster. Note that the flight v3 (just before maintenance on the piece of equipment E) does not belong to the same cluster as the flight v6 (just before maintenance on the piece of equipment E).

Therefore P3 will not be retained in order to identify a defective piece of equipment E. In addition, by combining P3 with one, the other or both parameters P1 and P2, the accuracy of a cluster associated with a defective piece of equipment E can only be reduced.

It is sought to minimise the number of pertinent parameters in a family, in order to limit the number of measurements of parameters to be taken when the method shown in FIG. 2 is implemented, while still providing that the accuracy of our predetermined criterion be above a predetermined accuracy threshold.

As such, the following can be attributed:
an accuracy of approximately 67% for the second cluster defined by an amplitude peak followed by oscillations of a lesser amplitude, associated with the parameter P1;
an accuracy of approximately 67% for the second cluster defined by a measurement of X=0, associated with the parameter P2;
an accuracy of 100% for the cluster C1 that combines the measurements of parameters P1 and P2.

A desired accuracy threshold is advantageously defined. The pertinent parameters and the criterion for forming the clusters are chosen according to the desired accuracy threshold.

It is therefore seen that the parameter P1 or P2 is sufficient in order to identify a defective piece of equipment E with an accuracy higher than 60%. It will not be necessary to introduce more parameters into the family of pertinent parameters associated with the identifier of the piece of equipment E. However in order to obtain an accuracy higher than 80% a measurement of P1 and P2 will have to be combined.

If accuracy higher than 80% is desired, the parameters P1 and P2 are selected in order to form a family of pertinent parameters associated with the identifier of the piece of equipment E. The predetermined criterion is the form of an amplitude peak followed by oscillations of a lesser amplitude for P1, and X=0 for P2. When these two conditions, called a predetermined criterion, are satisfied and when a message has been received reporting a fault that makes it possible to list E among the pieces of equipment that can be defective, an accuracy of 100% is assigned to the identifier of the piece of equipment E.

It can be provided that the priority assigned to an identifier (step $25_i$ in FIG. 2) be equal to the accuracy associated with the cluster wherein are ranked the measurements of corresponding pertinent parameters.

Another example of defining the priority is described in reference to FIG. 5.

A "model" is used to refer to the association, for each piece of equipment of an aircraft, of an equipment identifier, a family of pertinent parameters and a predetermined criterion. Advantageously, the fault information and measurements of parameters associated with preceding flights, are ranked according to for example the model of the aircraft, and even according to the airline that operates this aircraft. Thus, various models can be constructed according to the aircraft model or the airline that operates this aircraft.

FIG. 5 shows more clearly the notions of accuracy and of coverage of a cluster based on the measurements of parameters P7, P8 associated with preceding aircraft flights. P7 and P8 are useful parameters, used to form basic sets that are distributed into clusters.

In FIG. 5, the two parameters are not considered separately, but are put into relation in the form of a two-dimensional graph: the axis of the abscissa corresponds to the measurement of the parameter P7 and the ordinate axis corresponds to the measurement of the parameter P8. Other ways can be imagined to combine the measurements of different parameters (polynomials, spaces of N dimensions with integer N greater than 1, product, etc.). It is known, for each flight, whether or not the piece of equipment F is defective. A point on the graph forms a basic set of measurements that jointly represents P7 and P8 for the same preceding flight of an aircraft.

In FIG. 5, the points $51_1$ and $51_2$ represented by circles correspond to a defective piece of equipment F, and the points $52_1$ and $52_2$ identified by diamonds correspond to a piece of equipment F that is not defective. It is sought to distribute the points into two clusters, according to their location on the graph, particularly by applying the method described in reference to FIG. 3 (step 33). The straight line 53 shows a limit between two clusters. One cluster 540 corresponds to the points located in the vicinity of a mark 54. One cluster 550 corresponds to the points located in the vicinity of a mark 55.

Among the six points located in the vicinity of the mark 54, four correspond to a defective piece of equipment F. The accuracy of the cluster 540 is therefore $$67\%\left(\frac{4}{6}\right).$$

Among the five points that correspond to a defective piece of equipment F, four are in the cluster 540. The coverage of this cluster is therefore $$80\%\left(\frac{5}{6}\right).$$

It is therefore considered that the parameters P7, P8 can validly define a family of pertinent parameters associated with the identifier of the piece of equipment F. A "useful cluster" is used to refer to the cluster 540. The reference $51_1$ designates a basic set associated with a defective piece of equipment F, and ranked in the cluster 540 that mostly groups together the basic sets associated with a defective piece of equipment F. The reference $51_2$ designates a basic set associated with a defective piece of equipment F, and ranked in the cluster 550 that mostly groups together the basic sets associated with a piece of equipment F that is not defective. Likewise, the reference $52_1$ designates a basic set associated with a piece of equipment F that is not defective, and ranked in the cluster 540 and, the reference $52_2$ designates a basic set associated with a piece of equipment F that is not defective, and ranked in the cluster 550. The criterion, which makes it possible to know if new measurements of P7 and P8 correspond to a defective of not defective piece of equipment F, is the location relatively to the straight line 53:
to the left of this straight line, the points of coordinates {P7; P8} correspond to a defective piece of equipment F, with the associated accuracy and coverage;
to the right, the points of coordinates {P7; P8} correspond to a piece of equipment F that is not defective, with the associated accuracy and coverage.

A threshold for the accuracy, and a threshold for the coverage can be defined, making it possible to retain a choice of pertinent parameters (here P7 and P8 ) and of common characteristic defining clusters.

The point 56 corresponds to the measurements of the parameters P7 and P8 taken during a new flight of the aircraft, in a step 23 of the method shown in FIG. 2. A priority will be assigned to it based on an accuracy of 67% and on a coverage of 80%. The priority can combine the accuracy and the coverage. The priority is for example defined as the means (possibly weighted), of the accuracy and of the coverage. It can therefore be seen that during this new flight, the piece of equipment F was probably defective.

Other definitions of the priority can be considered according to the disclosure, for example by taking into account both the accuracy and the coverage such as defined hereinabove, associated with a useful cluster.

The disclosure is not limited to the examples mentioned, and many alternatives of the disclosure can be imagined, for example alternatives that implement all sorts of parameters and in different numbers. The information coming from the post flight reports and logbooks can be combined. It can be considered to refine the predetermined criterion and the choice of the pertinent parameters of a family after each aircraft flight, even a flight for which a priority has been assigned to an identifier by using an initial predetermined criterion and an initial family of pertinent parameters. Those skilled in the art can consider other methods of data mining, making it possible to obtain the families of pertinent parameters and associated criteria, without leaving the scope of this disclosure.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While the disclosure herein has been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A method of assistance in troubleshooting for an aircraft, the method comprising:
at a troubleshooting assistance server:
receiving a message transmitted by the aircraft and reporting a fault;
transmitting to an equipment identifying device, a query formed using the message, and obtaining in response a list of identifiers each associated with a piece of equipment the failure of which can be the cause of the fault, wherein each identifier on the list of identifiers is a unique Functional Item Number (FIN);
transmitting to an expert system, a query formed using the list of identifiers, and receiving a response that gives, for each FIN identifier, a family of pertinent parameters, with each pertinent parameter being associated with at least one sensor of the aircraft; and
transmitting, to a data acquisition device on board the aircraft, an acquisition order and receiving in return the measurements of the pertinent parameters;
wherein the expert system implements the following steps, for each family of pertinent parameters:
comparing measurements of the pertinent parameters of the family with a predetermined criterion associated with the family; and
according to the results of the comparison, assigning a priority, to the FIN identifier corresponding to the family, wherein a FIN identifier with high priority corresponds to a piece of equipment which is more likely to be defective and a FIN identifier with low priority corresponds to a piece of equipment which is less likely to be defective.

2. The method according to claim 1, wherein the priority of an identifier corresponds to how the corresponding piece of equipment is likely to be defective.

3. The method according to claim 1, comprising consulting the expert system in order to obtain, for each family of pertinent parameters, the predetermined criterion associated with the family.

4. The method according to claim 1, wherein a pertinent parameter comprises at least one element from among a Boolean, an integer, a floating point number, a sequence of numerical values that corresponds to a portion of a curve, a sequence of characters.

5. The method according to claim 1, comprising a step, referred to as an initial step, of determining, for each identifier, a family of pertinent parameters and a predetermined criterion that are associated.

6. The method according to claim 5, wherein the initial step comprises a storage:
of measurements of parameters, associated with preceding flights of aircraft; and
fault information associated with these flights and coming from a post flight report and/or a logbook of the aircraft.

7. The method according to claim 6, comprising:
for each preceding flight of aircraft, defining a basic set that groups together the measurements of at least one parameter referred to as a useful parameter;
ranking the basic sets into clusters defined by at least one common characteristic;
using the fault information, assigning, to the preceding flights and to the basic sets that correspond to these preceding flights, information according to which a predetermined piece of equipment is defective.

8. The method according to claim 7, comprising an adjustment of a choice of the at least one common characteristic and of the at least one useful parameter, in such a way as to form a cluster, referred to as a useful cluster:
   wherein a portion of the basic sets associated with the defective predetermined piece of equipment, is higher than a predetermined accuracy threshold,
with the at least one useful parameter corresponding to the family of pertinent parameters associated with an identifier of the predetermined piece of equipment, and the at least one common characteristic corresponding to the predetermined criterion associated with the family.

9. The method according to claim 7, comprising an adjustment of a choice of the at least one common characteristic and of the at least one useful parameter, in such a way as to form a cluster, referred to as a useful cluster:
   wherein a portion of the basic sets associated with the defective predetermined piece of equipment, is higher than a predetermined accuracy threshold, and
   receiving a portion of the basic sets associated with the defective predetermined piece of equipment, higher than a predetermined coverage threshold,
with the at least one useful parameter corresponding to the family of pertinent parameters associated with an identifier of the predetermined piece of equipment, and the at least one common characteristic corresponding to the predetermined criterion associated with the family.

10. The method according to claim 8, wherein the accuracy threshold is at least 60%.

11. The method according to claim 8, wherein the accuracy threshold is at least 90%.

12. The method according to claim 9, wherein the coverage threshold is at least 60%.

13. The method according to claim 9, wherein the coverage threshold is at least 90%.

14. The method according to claim 8, comprising an adjustment of the choice of the at least one useful parameter, such that the basic sets of the useful cluster group together the measurements of a minimum number of useful parameters.

15. The method according to claim 8, comprising a calculation of an accuracy of the useful cluster, defined by the ratio of a number of basic sets of the useful cluster associated with the defective predetermined piece of equipment, over a total number of basic sets of the useful cluster, with the assigned priority being equal to the accuracy.

16. The method according to claim 1, comprising testing the pieces of equipment the failure of which can be the cause of the fault, in the descending order of the priorities assigned to their respective identifiers.

* * * * *